(12) United States Patent
Koren et al.

(10) Patent No.: US 7,925,599 B2
(45) Date of Patent: Apr. 12, 2011

(54) DIRECTION-AWARE PROXIMITY FOR GRAPH MINING

(75) Inventors: Yehuda Koren, Elizabeth, NJ (US); Christos Faloutsos, Pittsburgh, PA (US); Hanghang Tong, Pittsburgh, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 667 days.

(21) Appl. No.: 12/069,500

(22) Filed: Feb. 11, 2008

(65) Prior Publication Data

US 2009/0204554 A1 Aug. 13, 2009

(51) Int. Cl.
*G06N 5/02* (2006.01)

(52) U.S. Cl. ............................................ 706/12
(58) Field of Classification Search ..................... 706/12
See application file for complete search history.

(56) References Cited

U.S. PATENT DOCUMENTS

| | | | |
|---|---|---|---|
| 6,175,844 | B1 | 1/2001 | Stolin |
| 6,226,408 | B1 | 5/2001 | Sirosh |
| 7,155,738 | B2 | 12/2006 | Zhu et al. |
| 7,281,002 | B2 | 10/2007 | Farrell |
| 2007/0294289 | A1 | 12/2007 | Farrell |

OTHER PUBLICATIONS

Tong, H., Koren, Y., Faloutsos, C., "Fast Direction-Aware proximity for graph mining", Proceeding KDD '07 Proceedings of the 13th ACM SIGKDD international conference on Knowledge discovery and data mining, 2007, pp. 747-756 [online]. Association of Computer Machinery [retrieved on Nov. 9, 2010].*
Faloutsos, C., et al., "Fast Discovery of Connection Subgraphs". In KDD pp. 118-127, 2004.
Koren, Y., et al., "Measuring and Extracting Proximity in Networks". In KDD, pp. 245-255, 2006.
Liben-Nowell, D., et al., "The Link Prediction Problem for Social Networks". In Proc. CIKM, pp. 556-559, 2003.
Tong, H., et al., "Center-Piece Subgraphs: Problem Definition and Fast Solutions". In KDD, pp. 404-413, 2006.

* cited by examiner

*Primary Examiner* — Donald Sparks
*Assistant Examiner* — Ola Olude-Afolabi

(57) ABSTRACT

A method and system for graph mining direction-aware proximity measurements. A directed graph includes nodes and directed edges connecting the nodes. A direction-aware proximity measurement is calculated from a first node to a second node or from a first group of nodes to a second group of nodes. The direction-aware proximity measurement from a first node to second node is based on an escape probability from the first node to the second node. Disclosed herein are methods for efficiently calculating one or multiple direction-aware proximity measurements. The direction-aware proximity measurements can be used in performing various graph mining applications.

25 Claims, 9 Drawing Sheets

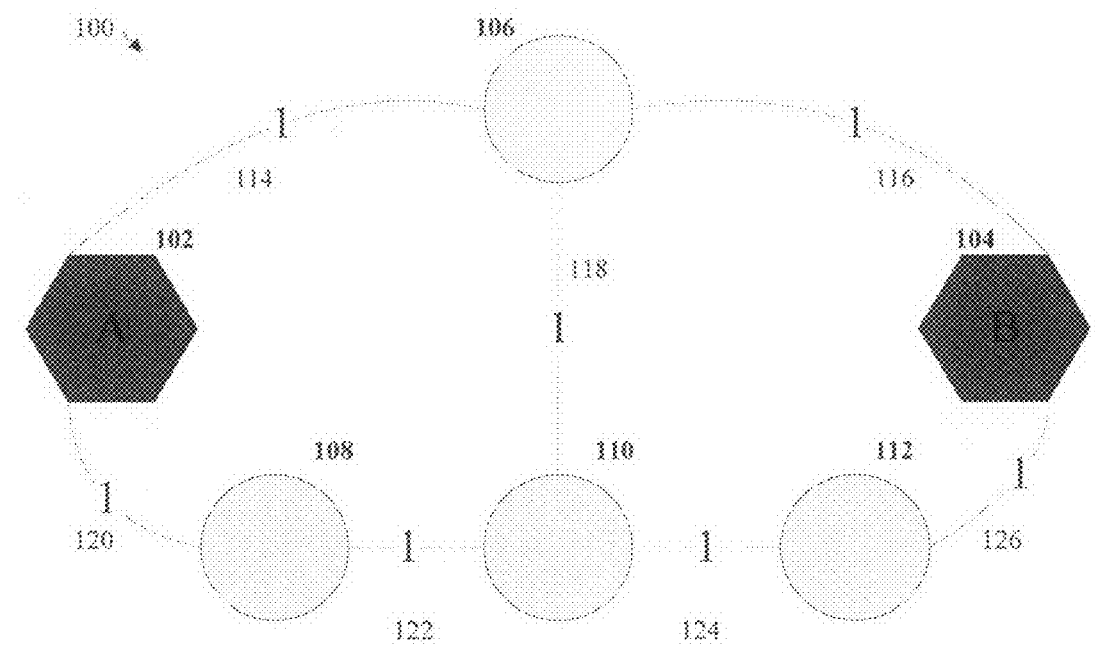

FIG. 6A

Input: The transition matrix $\mathbf{P}$, $c$, the starting node $i$ and the ending node $j$
Output: The proximity from $i$ to $j$ : $\widehat{\text{Prox}}(i,j)$
1. Initialize:
602
    1.1 If $i > j$, $i_0 = i$; else, $i_0 = i - 1$
    1.2 $\vec{v}^T = \vec{y}^T = \vec{e}_{i_0}^T$
2. Iterate until convergence:
604
    2.1 $\vec{y}^T \leftarrow c\vec{y}^T \mathbf{P}(\mathcal{V} - \{j\}, \mathcal{V} - \{j\})$
    2.2 $\vec{v}^T \leftarrow \vec{v}^T + \vec{y}^T$
606   3. Normalize: $\vec{v}^T \leftarrow \frac{\vec{v}^T}{\vec{v}^T(i_0)}$;
608   4. Return: $\widehat{\text{Prox}}(i,j) = c\vec{v}^T \mathbf{P}(\mathcal{V} - \{j\}, j)$

FIG. 6B

Input: The transition matrix $\mathbf{P}$, $c$, the starting group $\mathcal{A}$ and the ending group $\mathcal{B}(\mathcal{A} \cap \mathcal{B} = \Phi)$
Output: The group proximity from $\mathcal{A}$ to $\mathcal{B}$ : $\widehat{\text{Prox}}(\mathcal{A}, \mathcal{B})$
1. Initialize:
    1.1 Define matrix $\mathbf{P}'$ as in equation (16)
612
    1.2 $\vec{v}^T = \vec{y}^T = \vec{e}_{i_0}^T$, ($i_0 = |\mathcal{V} - \mathcal{A} - \mathcal{B}| + 1$)
2. Iterate until convergence:
614
    2.1 $\vec{y}^T \leftarrow c\vec{y}^T \mathbf{P}'$
    2.2 $\vec{v}^T \leftarrow \vec{v}^T + \vec{y}^T$
616   3. Normalize: $\vec{v}^T \leftarrow \frac{\vec{v}^T}{\vec{v}^T(i_0)}$;
618   4. Return: $\widehat{\text{Prox}}(\mathcal{A}, \mathcal{B}) = \frac{1}{|\mathcal{A}|} c\vec{v}^T \mathbf{P}(\mathcal{V} - \mathcal{B}, \mathcal{B})\vec{1}$

FIG. 7A

Input: The transition matrix P, $c$
Output: All proximities $\mathbf{Pr}' = [\widehat{\text{Prox}}(i,j)]_{1 \leq i \neq j \leq n}$ 702   1. Compute $\mathbf{G} = (\mathbf{I} - c\mathbf{P})^{-1}$
2. For $i = 1 : n$
704      For $j = 1 : n$ $(j \neq i)$
       Compute: $\widehat{\text{Prox}}(i,j) = \frac{g_{i,j}}{g_{i,i}g_{j,j} - g_{i,j}g_{j,i}}$
    EndFor
  EndFor

FIG. 7B

Input: The transition matrix P, $c$, two sets of groups:
    $\{\mathcal{A}_1, ..., \mathcal{A}_{n_1}\}, \{\mathcal{B}_1, ..., \mathcal{B}_{n_2}\}$
Output: $\mathbf{Pr}' = [\text{Prox}(\mathcal{A}_i, \mathcal{B}_j)]_{1 \leq i \leq n_1, 1 \leq j \leq n_2}$ 712   1. Compute $\mathbf{G} = (\mathbf{I} - c\mathbf{P})^{-1}$
2. For $i = 1 : n_1$
714     For $j = 1 : n_2$
     2.1 If $\mathcal{A}_i \neq \mathcal{B}_j$:
       2.1.1 $\mathbf{M}_0 = \mathbf{G}(\mathcal{B}_j, \mathcal{B}_j)^{-1}$
       2.1.2 $\mathbf{M} \leftarrow \mathbf{G}(\mathcal{A}_i, \mathcal{B}_j)\mathbf{M}_0\mathbf{G}(\mathcal{B}_j, \mathcal{A}_i)$
       2.1.3 $\mathbf{M} \leftarrow (\mathbf{G}(\mathcal{A}_i, \mathcal{A}_i) - \mathbf{M})^{-1}$
       2.1.4 $\mathbf{M} \leftarrow \mathbf{M}\mathbf{G}(\mathcal{A}_i, \mathcal{B}_j)\mathbf{M}_0$
       2.1.5 $\widehat{\text{Prox}}(\mathcal{A}_i, \mathcal{B}_j) = \frac{1}{|\mathcal{A}_i|}\vec{1}^T \mathbf{M} \vec{1}$
     2.2 Else: $\widehat{\text{Prox}}(\mathcal{A}_i, \mathcal{B}_j) = 1$
    EndFor
  EndFor

DIRECTION-AWARE PROXIMITY FOR GRAPH MINING

BACKGROUND OF THE INVENTION

The present invention is generally directed to graph mining in data processing applications. More specifically, the present invention is directed to calculating direction-aware proximity for graph mining.

Data mining refers to the sorting of large amounts of data to determine relevant and useful information. Graph mining is a type of data mining in which data is organized into a graph in order to extract information regarding the data. Such a graph can represent a so called "social network" in which nodes represent entities, such as people, and edges connecting the nodes represent some relationship, collaboration, or influence between the entities. Examples of social networks include nodes representing scientists, with edges connecting pairs that have co-authored papers; nodes representing scientific papers, with edges representing citations between the papers; nodes representing telephone numbers, with edges representing calls between the telephone numbers; nodes representing web sites, with edges representing links between the web sites; etc. Accordingly, nodes and edges of a graph can represent any entity and relationship between entities, respectively. In some graphs, the edges between nodes are weighted based on the relationship between the entities represented by the nodes. For example, in a graph representing a telephone network edges between nodes representing telephone numbers can be weighted by the number of calls between the telephone numbers.

An undirected graph refers to a graph in which the edges connecting nodes have no direction. Accordingly, an edge in an undirected graph represents a relationship that exists symmetrically between nodes. A directed graph refers to a graph in which the edges connecting nodes have a direction. Accordingly, an edge in a directed graph represents a relationship that exists from one node to another. For example, in an undirected graph of a telephone network, an edge between first and second node, representing first and second telephone numbers, respectively, represents calls made between the first and second telephone numbers regardless of who initiated the calls. In a directed graph of a telephone network, an edge from the first node to the second node represents calls from the first telephone number to the second telephone number.

Measuring proximity between nodes in a graph is a fundamental problem in graph mining. Typically, the proximity between nodes is a measure of similarity or distance between the entities represented by the nodes. However, conventional methods for measuring proximity are designed for undirected graphs. While such conventional proximity measurements can be applied to directed graphs, such proximity measurements do not account for the directional information in directed graphs.

BRIEF SUMMARY OF THE INVENTION

The present invention provides a method and system for measuring direction-aware proximity between nodes of a directed graph. The direction-aware proximity measurement measures proximity from one node to another, instead of between two nodes. Embodiments of the present invention measure the direction-aware proximity based on escape probability of random walks. The direction-aware proximity is designed to deal with practical problems associated with real life networks.

In one embodiment of the present invention, for a directed graph having nodes representing entities and edges representing relationships between the entities, a direction-aware proximity measurement is calculated from at least one first node to at least one second node based on an escape probability from the first node to the second node. The direction aware proximity measurement is then used in a graph mining application. The direction-aware proximity measurement can be defined as an escape probability from the first node to the second node, which is modified due to practical considerations. The direction-aware proximity measurement can be calculated from a single first node to a single second node on a large graph using an iterative method which avoids matrix inversion. The direction-aware proximity measurement can be calculated for multiple first and second node pairs on a medium sized graph using a method which utilizes a single matrix inversion. The calculated direction-aware proximity measurement can be used in various graph mining applications such as link prediction, generating a center-piece subgraph, and generating an attribute graph.

These and other advantages of the invention will be apparent to those of ordinary skill in the art by reference to the following detailed description and the accompanying drawings.

BRIEF DESCRIPTION OF THE DRAWINGS

FIGS. 1A and 1B illustrate an exemplary undirected graph and an exemplary directed graph, respectively;

FIG. 6A illustrates exemplary pseudo code for implementing a FastOneDAP method according to an embodiment of the present invention;

FIG. 6B illustrates exemplary pseudo code for implementing a FastOneGDAP method according to an embodiment of the present invention;

FIG. 7A illustrates exemplary pseudo code for implementing a FastAllDAP method according to an embodiment of the present invention;

FIG. 7B illustrates exemplary pseudo code for implementing a FastManyGDAP method according to an embodiment of the present invention;

DETAILED DESCRIPTION

The present invention is directed to direction-aware proximity measurements in a directed graph. Directed graphs include edges representing entities, such as people, and edges connecting nodes and representing a relationship between the entities. A proximity measurement is a measurement of similarity or distance between two entities or groups of entities. The edges of a directed graph have directions and connect nodes by pointing from one node to another node. The direction-aware proximity measurement is an asymmetric proximity measurement, in that the value of the proximity measurement from node A to node B is not necessarily the same as the proximity measurement from node B to node A.

Figure 1B:
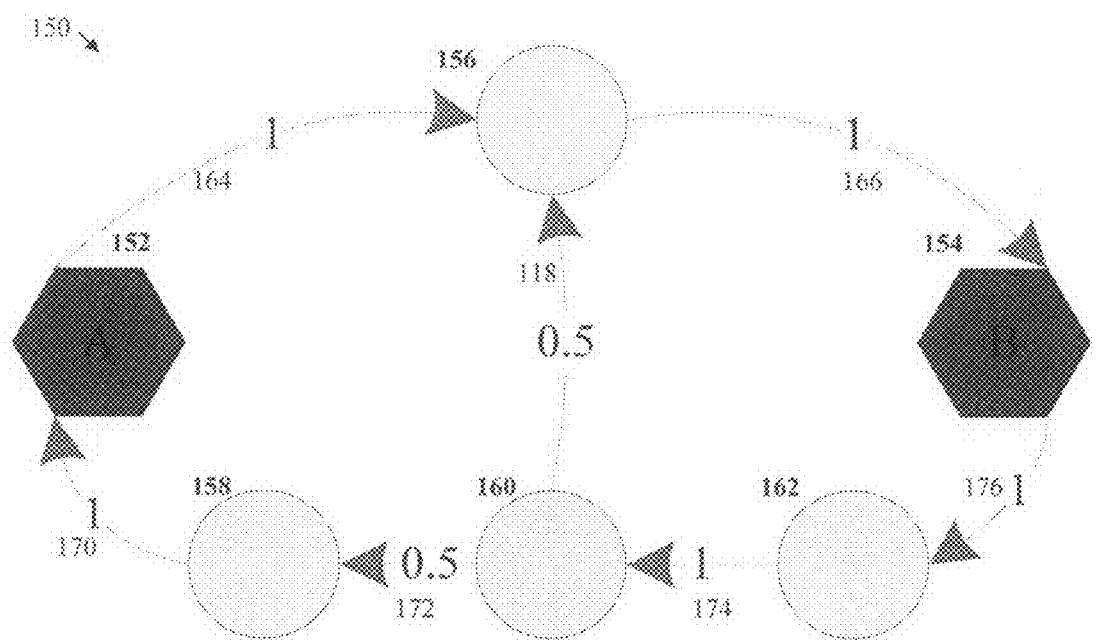

FIGS. 1A and 1B illustrate an exemplary undirected graph 100 and an exemplary directed graph 150, respectively. As illustrated in FIG. 1A, the undirected graph 100 contains nodes 102, 104, 106, 108, 110, and 112, and edges 114, 116, 118, 120, 122, 124, and 126. Each of the edges 114, 116, 118, 120, 122, 124, and 126 has a weight of 1. The edges 114, 116, 118, 120, 122, 124, and 126 connect the nodes 102, 104, 106, 108, 110, and 112 but do not have any direction. Accordingly, a single proximity measurement exists between node A (102) and node B (104).

As illustrated in FIG. 1B, the directed graph 150 contains nodes 152, 154, 156, 158, 160, and 162, and edges 164, 166, 168, 170, 172, 174, and 176. Each of the edges 164, 166, 168, 170, 172, 174, and 176 has a corresponding weight and a direction. Since direction-aware proximity measurement is asymmetric, the proximity from node A (152) to node B (154) can be different from the proximity from node B (154) to node A (152).

Figure 2:
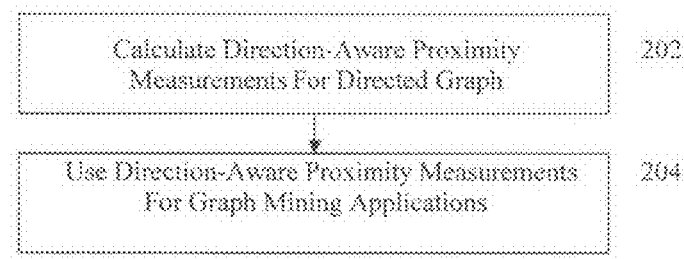
FIG. 2 illustrates a graph mining method using direction-aware proximity according to an embodiment of the present invention.

FIG. 2 illustrates a graph mining method using a direction-aware proximity measurement according to an embodiment of the present invention. The method of FIG. 2 is used for graph mining a directed graph which represents a network of entities (nodes) connected by some relationships (edges). At step 202, direction-aware proximity measurements are calculated for the directed graph. Each direction-aware proximity measurement is calculated to measure the proximity from one node to another node on the directed graph. It is possible that only one direction-aware proximity measurement be calculated for a single pair of nodes or direction-aware proximity measurements be calculated for multiple pairs of nodes (in one or both directions). It is also possible that direction-aware proximity measurements be calculated from one group of nodes to another group of nodes. The direction-aware proximity measurement and methods for efficiently calculating the direction-aware proximity measurement are described in greater detail below. At step 204, the direction aware proximity measurements are used in graph mining applications. The direction-aware proximity measurements can be used in a variety of graph mining applications, such as link prediction, directed center-piece subgraph generation, and attribute graph generation, which are described in greater detail below.

The node-to-node direction-aware proximity measurement can be defined based on properties of random walks associated with the directed graph. Using random walks, the direction-aware proximity measurement is able to characterize relationships between nodes based on multiple paths. Random walks are used to characterize parallel properties of electric networks. For example, random walks can be used in measuring proximity between nodes in electric networks by employing the notion of effective conductance. However, since electric networks are inherently undirected, effective conductance cannot be used to calculate the direction-aware proximity measurement. However, random walks can be defined using an escape probability in order to account for directional information of a directed graph.

As defined herein, the escape probability $ep_{i,j}$ from node i to node j is the probability that a random particle that starts from node i will visit node j before it returns to node i. The direction-aware proximity can be defined using the escape probability, such that the proximity $Prox(i,j)$ from node i to node j is the escape probability $ep_{i,j}$.

An important quantity for calculating the escape probability $ep_{i,j}$ is the generalized voltage at each of the nodes in the directed graph, denoted by $v_k(i,j)$. The generalized voltage $v_k(i,j)$ is defined as the probability that a random particle that starts from node k will visit j before node i. Accordingly, the direction-aware proximity measurement can be expressed as:

$$Prox(i, j) \triangleq ep_{i,j} = \sum_{k=1}^{n} p_{i,k} \cdot v_k(i, j) \qquad (1)$$

where $p_{i,k}$ is the probability of a direct transition from node i to node k. Using expression (1) for the exemplary directed graph of FIG. 1B, the direction aware proximity measurement from node A 152 to node B 154 and from node B 154 to node A 152 can be calculated, such that $Prox(A,B)=1$ and $Prox(B,A)=0.5$.

Table 1 below provides a list of symbols used herein. Following standard notation, calligraphic font is used for sets (e.g., $\mathcal{V}$), bold capitals for matrices (e.g., W,P), and arrows for column vectors (e.g., $\vec{1}$).

TABLE 1

| Symbol | Definition |
|---|---|
| $W = [w_{i,j}]$ | the weighted graph, $1 \leq i, j \leq n$, $w_{i,j}$ is the weight of edge $i \rightarrow j$ |
| $A^T$ | the transpose of matrix A |
| D | n × n diagonal matrix of out-degrees: $D_{i,i} = \Sigma_j w_{i,j}$ and $D_{i,j} = 0$ for $i \neq j$ |
| $P = [p_{i,j}]$ | the transition matrix associated with the graph |
| $G = [g_{i,j}]$ | the G-matrix associated with P: $G = (I - cP)^{-1}$ |
| $\mathcal{V}$ | the whole set of the nodes $\mathcal{V} = \{1, \ldots, n\}$ |
| $\mathcal{A}, \mathcal{B}$ | two groups of nodes $\mathcal{A} = \{i_1, \ldots i_{|\mathcal{A}|}\}$, $\mathcal{B} = \{j_1, \ldots j_{|\mathcal{B}|}\}$, $\mathcal{A}, \mathcal{B} \subseteq \mathcal{V}$ |
| $P(\mathcal{A}, \mathcal{B})$ | a block of matrix $P:P(\mathcal{A}, \mathcal{B}) = [p_{i,j}]$, $(i \in \mathcal{A}, j \in \mathcal{B})$ |
| $P(i, :)$ | $i^{th}$ row of matrix P |
| $P(:, j)$ | $j^{th}$ column of matrix P |
| $Prox(i, j)$ | node proximity from node i to node j |
| $Prox(\mathcal{A}, \mathcal{B})$ | group proximity from group $\mathcal{A}$ to group $\mathcal{B}$ |
| $\vec{1}$ | a (column) vector whose all elements are 1's |
| $\vec{e}_i$ | a column vector whose $i^{th}$ element is 1 and the rest elements are 0's |
| c | 1 − c is the transition probability from each node to the sink |
| n | the total number of the nodes in the graph |
| m | the maximum number of iterations |

Given a weighted directed graph W, there is a natural random walk associated with the graph, whose transition matrix P is the normalized version of W, defined as $P=D^{-1}W$. As shown in Table 1, D is the diagonal matrix of the node out-degrees (specifically, the sum of the outgoing weights). However, for real life applications, this matrix may lead to escape probabilities that do not agree with human intuition for measuring proximity. Accordingly, the direction-aware proximity measurement expressed in expression (1) is modified based on practical considerations to improve the quality of the direction-aware proximity measurement.

One such modification involves augmenting the network represented by the directed graph with a universal sink. When measuring the escaped probability from i to j using expression (1), it is assumed that the random particle must eventually reach either i or j. This means that no matter how long the particle wanders through the network, it will make unlimited tries until it reaches i or j. This ignores any noise or friction that exists in the system and causes the particle to disappear or decay over time. In particular this problem may be manifested in dead-end paths, or degree-1 nodes, which are common in practical networks whose degree distribution follows a power law.

Figure 3A:
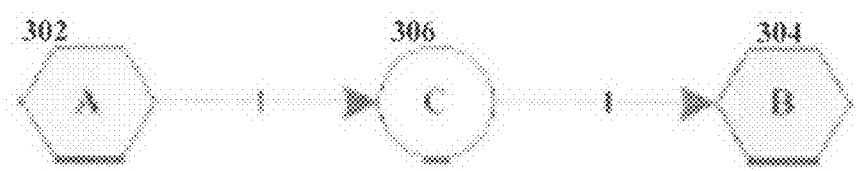
FIGS. 3A and 3B illustrate exemplary directed graphs which show the effect of degree-1 nodes on the direction-aware proximity measurement.
Figure 3B:
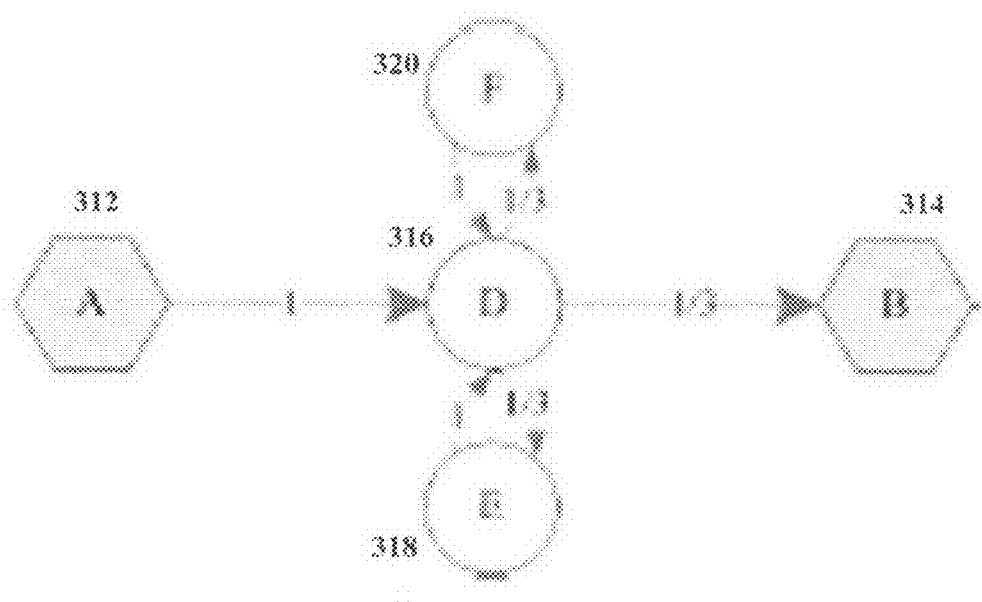

FIGS. 3A and 3B illustrate exemplary directed graphs which show the effect of degree-1 nodes on the direction-aware proximity measurement. As illustrated in FIGS. 3A and 3B, nodes E and F (318 and 320) are degree-1 nodes in the graph of FIG. 3B, which distract the A-D-B (312-316-314) connection, such that the proximity from A (312) to B (314) in FIG. 3B should be less than the proximity from A (302) to B (304) in FIG. 3A, where the A-C-B (302-306-304) connection is not interrupted. However, using the direction-aware proximity measurement expressed in Equation (1), the direction-aware proximity from A (302) to B (304) in FIG. 3A is the same as the direction-aware proximity from A (312) to B (314) in FIG. 3B (both equal to 1). Accordingly, the influence of the degree-1 nodes, E and F (318 and 320), is not taken into account in the direction-aware proximity measurement expressed in Equation (1). To address this issue, the friction in the system can be modeled by augmenting the network with a new node with a zero out degree known as a universal sink (mimicking an absorbing boundary). In this case, each node in the network has a small transition probability, 1−c, to reach the universal sink, and whenever the random particle reaches the universal sink, it stays there forever. For example if a universal sink is added to the graphs of FIGS. 3A and 3B with c=0.9, Pr ox(A,B)=0.81 in FIG. 3A and Pr ox(A,B)=0.74 in FIG. 3B. In order to modify the direction-aware proximity measurement, equation (1) is modified such that:

$$ep_{i,j} = \sum_{k=1}^{n} c \cdot p_{i,k} \cdot v_k(i,j). \quad (2)$$

Figure 4A:
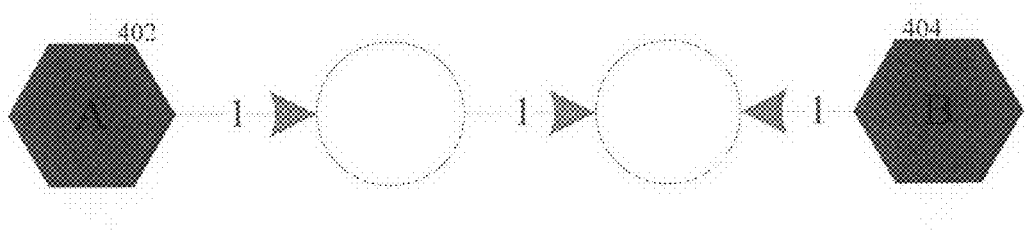
FIG. 4A illustrates a graph containing a weakly connected pair.

Another modification to the direction-aware proximity measurement introduces partial symmetrization to the directed graph. A weakly connected pair is two nodes that are not connected by any direct path, but become connected when considering undirected paths. FIG. 4A illustrates a graph containing a weakly connected pair. As illustrated in FIG. 4A, node A (402) and node B (404) are not connected by any directed path, but are connected when the directions of the edges are ignored. For such weakly connected pairs, the direction-aware proximity will be zero. However, in some situations, especially when there are missing links in the graph, this may not be desirable. For example, in phone call networks, the fact that person A has called person B implies a possible symmetric relationship between the two persons and thereby a greater probability that B will call A (or already has called A but the link is missing).

Figure 4B:
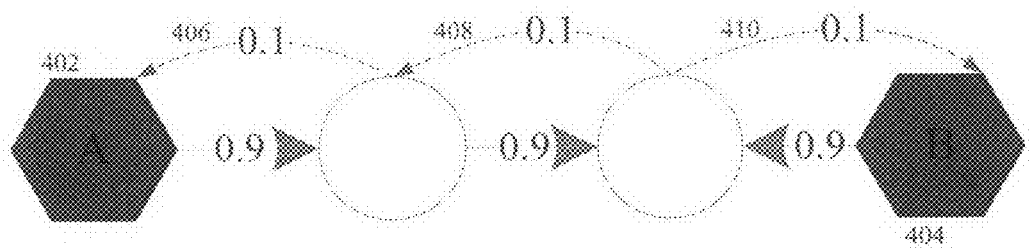
FIG. 4B illustrates introduction of backward edges for the graph of FIG. 4A.

A random walk modeling of the problem provides the flexibility to address this issue by introducing lower probability backward edges, such that whenever an edge $w_{i,j}$ is observed in the original graph, a "backward" edge is added to the graph in the opposite direction $w_{j,i} \propto w_{i,j}$. In other words, the original graph W is replaced with $(1-\beta)W + \beta W^T$ ($0 < \beta < 1$). For example, FIG. 4B illustrates the introduction of backward edges for the graph of FIG. 4A. As illustrated in FIG. 4B, by introducing the backward edges 406, 408, and 410 with $\beta=0.1$, Pr ox(B,A)=0.009, which is much smaller than Pr ox(A,B)=0.81, but nonetheless greater than zero. It can be noted that $\beta=0.5$ is equivalent to ignoring edge directions.

Another modification can be made to the direction-aware proximity measurement to prevent size bias when dealing with a candidate graph that is a smaller portion of a larger directed graph. Many directed graphs are very large, so when calculating the proximity, a smaller portion of the directed graph, referred to as a candidate graph, may be used to speed-up the calculations. Known techniques for selecting a candidate graph select a moderately sized graph that contains portions of the network relevant to a proximity query and will allow quick computation. Such techniques can be used to select a candidate graph for calculating the direction-aware proximity measurement.

Figure 5A:
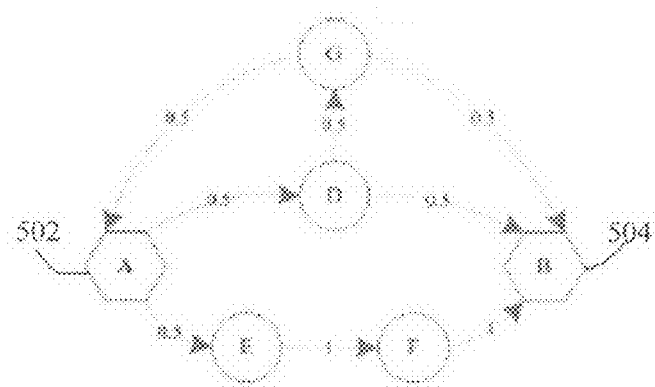
FIG. 5A illustrates an exemplary directed graph.
Figure 5B:
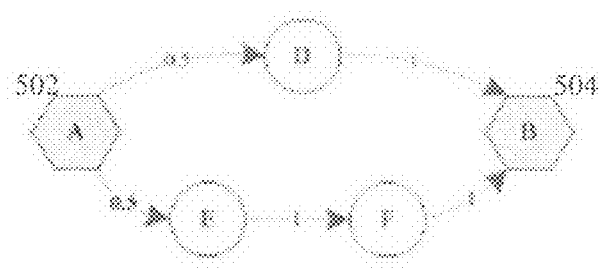
FIG. 5B illustrates a candidate graph for the directed graph of FIG. 5A without out-degree preservation.

For a robust proximity measure, the proximity measurement based on the candidate graph should not be greater than a proximity measurement based on the full graph. The desired situation is that the proximity from one node to another node will monotonically converge to a stable value as the candidate graph becomes larger. However, this may not be the case for the direction-aware proximity measurement if the escape probability is calculated directly on a candidate graph. FIG. 5A illustrates an exemplary directed graph and FIG. 5B illustrates a candidate graph for the directed graph of FIG. 5A without out-degree preservation. The direction-aware proximity from node A (502) to node B (504) in the original graph of FIG. 5A is Pr ox(A,B)=0.875. The candidate graph of FIG. 5B removes node G from the original graph of FIG. 5A, and Pr ox(A,B)=1 in the candidate graph of FIG. 5B. The candidate graph of FIG. 5B does not preserve outgoing edges from the candidate graph that are in the original graph, thus causing the escape probability and direction-aware proximity measurement to be greater in the candidate graph than in the original graph.

Figure 5C:
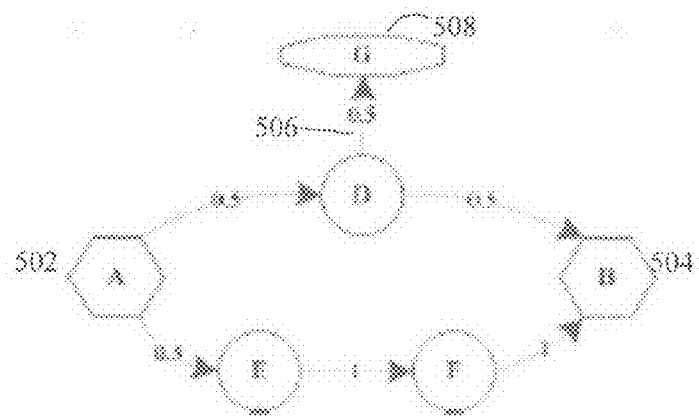
FIG. 5C illustrates a candidate graph for the directed graph of FIG. 5A with degree preservation.

In order to prevent a candidate graph in which a direction-aware proximity measurement from one node to another node is greater than in the original graph, embodiments of the present invention utilize an out-degree preserving candidate graph. FIG. 5C illustrates a candidate graph for the directed graph of FIG. 5A with degree preservation. As illustrated in FIG. 5C, outgoing edge 506 is preserved in the candidate graph. The proximity from node A (502) to node B (504) in the candidate graph of FIG. 5C is Pr ox(A,B)=0.75, which is less than the proximity from node A (502) to node B (504) in the original graph of FIG. 5A. Although all outgoing edges (506 in FIG. 5C) are preserved in such candidate graphs, the nodes (node G in FIG. 5A) that such edges lead to and all edges leading from such nodes are not preserved in the candidate graph, but are replaced by a sink. For example, node G in FIG. 5A is replaced by a sink 508 in FIG. 5C. Accordingly, when calculating the escaped probability using a random walk, when the random particle leaves the candidate graph via an outgoing edge, it cannot return to the candidate graph. Accordingly, considering two nodes i and j, where Pr ox$^{Ori}$ is the direction-aware proximity measurement from i to j calculated based on the original graph, and Pr ox$^{Cand}$ is the direction-aware proximity measurement from i to j calculated based on the a degree preserving candidate graph, then Pr ox$^{Ori}$ ≧ Pr ox$^{Cand}$, for any pair of nodes i and j.

The direction-aware proximity measurement described herein can be generalized to measure proximity between two groups of nodes. In this case, the group escape probability gep$_{A,B}$ can be defined as the probability that a random particle, starting from any node in the group A will visit any node in group B before it visits any node in group A. Analogously, $v_k(A,B)$ can be defined as the probability that a random particle, starting from node k, will visit any node in group B before visiting any node in group A. Accordingly, the direction-aware proximity can be defined as:

$$Prox(\mathcal{A}, \mathcal{B}) \stackrel{\Delta}{=} gep_{\mathcal{A},\mathcal{B}} = \frac{1}{|\mathcal{A}|} \sum_{i \in \mathcal{A}} \sum_{k=1}^{n} c \cdot p_{i,k} \cdot v_k(\mathcal{A}, \mathcal{B}) \quad (3)$$

Based on equations (2) and (3), it can be seen that node-to-node direction-aware proximity is a special case of the group-to-group proximity, by setting A={i} and B={j}. Accordingly, any description herein relating to calculating node-to-node direction-aware proximity can be generalized to the calculation of group-to-group direction-aware proximity.

As described above, a direction-aware proximity from one node to another node in a directed graph can be defined based on escape probability with some modifications due to practical considerations of real-life networks. Referring to FIG. 2, at step 202 of FIG. 2, such direction-aware proximity measurements are calculated for a directed graph. Various methods for efficiently calculating direction-aware proximity are described below. Accordingly, such methods are possible methods for implementing step 202 of FIG. 2 according to embodiments of the present invention.

It is possible to calculate the direction-aware proximity measurement defined above straight-forwardly by solving a linear system, which involves matrix inversion. The direction-aware node proximity is based on the following linear system:

$$v_k(i, j) = \sum_{t=1}^{n} c \cdot p_{k,t} v_t(i, j) (k \neq i, j) \quad (4)$$

$$v_i(i, j) = 0; \text{ and } v_j(i, j) = 1.$$

By solving the above linear system, the direction-aware proximity measurement can be expressed as:

$$Pr\, ox(i,j) = c^2 P(i,I) G'' P(I,j) + c p_{i,j} \quad (5)$$

where $I = V - \{i,j\}$; $P(i,I)$ is the $i^{th}$ row of P without $i^{th}$ and $j^{th}$ elements; $P(I,j)$ is the $j^{th}$ column of P without $i^{th}$ and $j^{th}$ elements; and:

$$G'' = (I - cP(I,I))^{-1}. \quad (6)$$

This linear system based calculation can be similarly applied to calculating group-to-group direction-aware proximity. Let $C = A \cap B$. If $C = \Phi$ ($\Phi$ represents the empty set), the group proximity, Pr ox(A,B), of equation (3) can be determined by equation (7) below; otherwise, if $C \neq \Phi$, Pr ox(A,B) can be determined by equation (8) below:

$$Prox(\mathcal{A}, \mathcal{B}) = \frac{\vec{1}^T (c^2 P(\mathcal{A}, I) G'' P(I, \mathcal{B}) + c P(\mathcal{A}, \mathcal{B})) \vec{1}}{|\mathcal{A}|} \quad (7)$$

$$Prox(\mathcal{A}, \mathcal{B}) = \frac{|\mathcal{A} - C| Prox(\mathcal{A} - C, \mathcal{B} - C) + |C|}{|\mathcal{A}|} \quad (8)$$

where $I = V - (A \cup B)$, $A - C = \{i, i \in A, i \notin C\}$, $B - C = \{i, i \in B, i \notin C\}$, $G'' = (I - cP(I))^{-1}$.

Both equations (5) and (7) involve G'', an inversion matrix. For the node-to-node direction-aware proximity calculation for a graph having n nodes, the inversion of the n×n matrix is the major computational cost. This matrix inversion is also the major computational cost in the group-to-group direction-aware proximity calculation, assuming that the size of the groups are significantly smaller than the size of the entire graph, i.e., |A|<<n and |B|<<n. The matrix inversion can cause the straight-forward calculation method to be inefficient. For example, for a large graph, such as one with hundreds of thousands of node, a single matrix inversion could be slow if not impossible. In this case, it is desirable avoid matrix inversion even when calculating a single direction aware proximity measurement. Furthermore, the straight-forward calculation method described above requires a different matrix inversion to calculate each direction-aware proximity measurement. Thus, calculating k proximity measurements requires performing k separate matrix inversions. Accordingly, it is desirable to reduce the number of matrix inversions required when calculating multiple direction-aware proximity measurements.

According to an embodiment of the present invention, a method for efficiently calculating a direction-aware proximity measurement for a pair of nodes is a directed graph without performing matrix inversion. This method is referred to herein as the "FastOneDAP" method. FIG. 6A illustrates exemplary pseudo code for implementing the FastOneDAP method. The FastOneDAP method provides a fast solution for calculating a single direction-aware proximity measurement in a large directed graph.

As illustrated in FIG. 6A, the FastOneDAP method estimates a proximity measurement from node i to node j based on the transition matrix P and c. At 602, the FastOneDAP method is initialized by setting two vectors $\vec{y}^T$ and $\vec{v}^T$. At 604, vectors $\vec{y}^T$ and $\vec{v}^T$ are iteratively updated until convergence. $\vec{y}^T$ is an update vector calculated at each iteration based on the transition matrix P without row j and column j. The update vector $\vec{y}^T$ is added to $\vec{v}^T$ at each iteration to update $\vec{v}^T$. The vector $\vec{v}^T$ represents the generalized voltage (without $j^{th}$ entry). At 606, $\vec{v}^T$ is normalized by $\vec{v}_{i_0}^T$. At 608, an estimate $\hat{Pr}ox(i,j)$ of the direction-aware proximity measurement from node i to node j is calculated based on $\vec{v}^T$ and output.

In the FastOneDAP method, the major computational cost lies in the iterative step (604). If m is the maximum number of iterations and E the number of total edges in the graph, the complexity of the FastOneDAP method is O(mE). Accordingly, FastOneDAP is linear with respect to the number of edges in the graph. Often, real graphs are sparse, which means that E is much less than $n^2$. Thus, the FastOneDAP method is significantly more efficient than the straight-forward direction-aware proximity calculation, whose complexity is $O(n^3)$ due to the inversion matrix inversion.

Block matrix inversion can be used to prove that $\hat{Pr}ox(i,j)$ is an accurate direction-aware proximity measurement. If a matrix M is partitioned into four blocks:

$$M = \begin{pmatrix} A & B \\ C & D \end{pmatrix} \quad (9)$$

then, $$M^{-1} = \begin{pmatrix} A^{-1} + A^{-1} B S^{-1} C A^{-1} & -A^{-1} B S^{-1} \\ -S^{-1} C A^{-1} & S^{-1} \end{pmatrix} \quad (10)$$

where $S = D - CA^{-1}B$.

Based on the block matrix inversion, it can be proved that the direction-aware proximity measurement $\hat{Pr}ox(i,j)$ calculated by the FastOneDAP method converges to the direction-aware proximity $\text{Pr ox}(i,j)$ defined in equation (5). Without loss of generality it is only necessary to prove the case when $i=n-1$ and $j=n$. Let $V_{n-1}=V-\{j\}=\{1,\ldots,n-1\}$ and $V_{n-2}=V-\{i,j\}=\{1,\ldots,n-2\}$. For uniformity, V is hereinafter referred to as $V_n$. With this notation, $i_0=n-1$ and $G''=[g_{i,j}'']=(I-cP(V_{n-2},V_{n-2}))^{-1}$.

$$\text{Define: } G'=[g_{i,j}']=(I-cP(V_{n-1},V_{n-1}))^{-1}. \tag{11}$$

First, it can be noted that as the number of iterations k (604 of FIG. 6A) approaches infinity:

$$\|\vec{y}^T\|=\|\vec{e}_i^T c^k P(V_{n-1}, V_{n-1})^k\|\le c^k\|\vec{e}_i^T\|\|P(V_{n-1},V_{n-1})^k\|\le c^k\|P\|\le c^k\to 0 \tag{12}$$

which proves that convergence of the iteration step (604 of FIG. 6A) in the FastOneDAP method. Next, by Taylor expansion, it can be determined that:

$$\vec{y}^T = \sum_{k=0}^{\infty} \vec{e}_i^T c^k P(\mathcal{V}_{n-1}, \mathcal{V}_{n-1})^k \tag{13}$$

$$= \vec{e}_i \sum_{k=0}^{\infty} c^k P(\mathcal{V}_{n-1}, \mathcal{V}_{n-1})^k \to \vec{e}_i(I - cP(\mathcal{V}_{n-1}, \mathcal{V}_{n-1}))^{-1}$$

$$= G'(i, :)$$

which proves that at the end of the iteration step (604 of FIG. 6A), $\vec{v}^T$ will converge to the $i^{th}$ row of G'. Furthermore, based on the block matrix inversion:

$$s = c^2 P(i, \mathcal{V}_{n-1}) G'' P(\mathcal{V}_{n-1}, i) \tag{14}$$

$$g_{i,i}' = \frac{1}{1 - cp_{i,i} - s}$$

$$G'(i, \mathcal{V}_{n-2}) = cP(i, \mathcal{V}_{n-2}) G'' g_{i,i}'.$$

Finally, it is shown that:

$$\hat{\text{Prox}}(i, j) = \vec{y}^T cP(\mathcal{V}_{n-1}, j) \tag{15}$$

$$\to \frac{G'(i, :)}{g_{i,i}'} cP(\mathcal{V}_{n-1}, j)$$

$$= cP(i, \mathcal{V}_{n-2}) G'' P(\mathcal{V}_{n-2}, j) + cp_{i,j}$$

$$= \text{Prox}(i, j).$$

According to an embodiment of the present invention, a method (referred to herein as the "FastOneGDAP" method) can be applied, similarly to the FastOneDAP method, for efficiently calculating a group-to-group direction-aware proximity measurement on a large directed graph. FIG. 6B illustrates exemplary pseudo code for implementing the FastOneGDAP method. The FastOneGDAP method utilizes the following expression:

$$P' = \begin{pmatrix} P(\mathcal{I}, \mathcal{I}) & P(\mathcal{I}, \mathcal{A})\vec{1} \\ \vec{1}^T P(\mathcal{A}, \mathcal{I}) & \vec{1}^T P(\mathcal{A}, \mathcal{A})\vec{1} \end{pmatrix} \tag{16}$$

where $I=V-(A\cup B)$. The initialization (612), iteration (614), normalization (616), and output (618) steps of the FastOneGDAP method of FIG. 6B are similar to the initialization (602), iteration (604), normalization (606), and output (608) steps of FIG. 6A, but are applied to group-to-group calculations instead of node-to-node calculations. In particular, FastOneGDAP is initialized by setting the matrix P' and two vectors ($\vec{y}^T$ and $\vec{v}^T$) at 612. At 614, vectors $\vec{y}^T$ and $\vec{v}^T$ are iteratively updated until convergence. At 616, the vector $\vec{v}^T$ is normalized by $\vec{v}_{i_0}^T$. At 618, an estimate $\hat{\text{Prox}}(A,B)$ of the group direction-aware proximity measurement from node set A to node set B is calculated based on $\vec{v}^T$ and output.

If m is the maximum number of iterations and E' the number of total edges in P', the complexity of the FastOneGDAP method is O(mE'). Assuming that $|A|\ll n$ and $|B|\ll n$, then $E'\approx E$. In this case, the complexity of the FastOneGDAP method is O(mE). Furthermore, the direction-aware proximity measurement $\hat{\text{Prox}}(A,B)$ calculated by the FastOneGDAP method converges to the direction-aware proximity measurement $\text{Pr ox}(A,B)$ calculated using equation (7).

According to another embodiment of the present invention, a method for efficiently calculating direction-aware proximity measurements for multiple pairs of nodes on a directed graph is described herein. This method is referred to herein as the "FastAllDAP" method. FIG. 7A illustrates exemplary pseudo code for implementing the FastAllDAP method. The FastAllDAP method provides a fast solution for calculating all pair-wise direction-aware proximity measurements in a directed graph using a single matrix inversion. Calculation of many pair-wise direction-aware proximity measurements in the same network involves solving many linear systems, with one matrix inversion for each proximity measurement. However, there is much redundancy among the different linear systems. The FastAllDAP method solves a single linear system (i.e., inverts a single matrix) and use the result to quickly solve the other linear systems.

As illustrated in FIG. 7A, the FastAllDAP method calculates the direction-aware proximity measurements for each pair of nodes (in each direction) based on the proximity matrix P and c. At 702, the FastAllDAP method calculates the matrix G, which is the inverse of a Laplacian-like matrix I−cP of the graph. At 704, the FastAllDAP method calculates the direction-aware proximity measurement for each i, j pair based on G. In particular, FastAllDAP method calculates an estimate $\hat{\text{Prox}}(i,j)$ of the direction-aware proximity measurement by four entries in the matrix G (i.e., $g_{i,i}$, $g_{i,j}$, $g_{j,i}$ and $g_{j,j}$).

The FastAllDAP method reduces the matrix inversion operations from n(n−1) in the straight-forward calculation, to a single matrix inversion operation. Furthermore, FastAllDAP gives exactly the same result as equation (5). Without loss in generality, in order to prove that FastAllDAP gives exactly the same result as equation (5), it is only necessary to prove that when $i=n-1$ and $j=n$, $\hat{\text{Prox}}(n-1,n)=\text{Pr ox}(n-1,n)$. Let G' be defined as in equation (11). According to equation (15):

$$\text{Prox}(n-1, n) = \frac{G'(n-1, :)cP(\mathcal{V}_{n-1}, n)}{g_{n-1,n-1}'} \tag{17}$$

Furthermore, applying the block matrix inversion on G and G' gives:

$$G'(n-1, :)cP(\mathcal{V}_{n-1}, n) = \frac{g_{n-1,n}}{g_{n,n}} \tag{18}$$

$$g_{n-1,n-1}' = g_{n-1,n-1} - \frac{g_{n-1,n}g_{n,n-1}}{g_{n,n}}.$$

Accordingly, combining equations (17) and (18) proves that FastAllDAP gives the same result as equation (5).

According to an embodiment of the present invention, according to an embodiment of the present invention, a method (referred to herein as the "FastManyGDAP" method) can be applied, similarly to the FastAllDAP method, for efficiently calculating multiple group-to-group direction-aware proximity measurements on a large directed graph. FIG. 7B illustrates exemplary pseudo code for implementing the FastManyGDAP method. As illustrated in FIG. 7B, for two sets of groups $\{A_1 \ldots A_{n_1}\}$ and $\{B_1 \ldots B_{n_1}\}$, the FastManyGDAP method calculates all $n_1 \times n_2$ induced group direction-aware proximity measurements. Steps 712 and 714 of the FastManyGDAP method of FIG. 7B are similar to steps 702 and 714 of the FastAllDAP method of FIG. 7A, except adapted to deal with the two groups. Note that in FastAllDAP (FIG. 7A), an estimate of direction-aware proximity is determined by four entries of matrix G; while in FastManyGDAP (FIG. 7B), an estimate of group direction-aware proximity is determined by four blocks of matrix. Assuming that $|A_i| \ll n$ and $|B_j| \ll n$, then compared with step 1 (712) of the FastManyGDAP method, the computational cost of steps 2.1.1 and 2.1.3 can be ignored. Thus, the FastManyGDAP method reduces the computational cost from $O(n_1 \times n_2)$ to $O(1)$. Furthermore, the FastManyGDAP method gives the same result as equation (7).

Returning to FIG. 2, at step 204 of FIG. 2, direction aware proximity measurements are used in graph mining applications. Accordingly, once one or more direction-aware proximity measurements are calculated for nodes or groups in a directed graph, the direction-aware proximity measurements can be used in various graph mining applications. For example, the direction-aware proximity measurements can be used in such graph mining applications as link prediction, generation of center piece subgraphs, and generation of attribute graphs. These graph mining applications are describe in greater detail below. It is to be understood that these graph mining applications are exemplary, and direction-aware proximity measurements can be used in any type of graph mining application.

According to an embodiment of the present invention, the direction-aware proximity measurements calculated as described above can be directly used for link prediction. More specifically, given two nodes, the direction-aware proximity measurement can be used to predict the existence of a link (or, an edge) between the nodes. Also, given two adjacent (linked) nodes, the direction-aware proximity measurements can be used to predict the direction of the link between the adjacent nodes.

In order to predict whether a link exists between two nodes i and j, a link is predicted between i and j if Pr ox(i,j)+Pr ox(j,i)>th, where th is a given threshold. It is also possible to use group-to-group proximity measurements to predict a link between two nodes by predicting a link between i and j if Pr ox(N(i),N(j))+Pr ox(N(j),N(i))>th, where N(i) and N(j) are in the neighborhoods of i and j, respectively. In order to determine the direction of a link between i and j, the link is predicted from i to j if Pr ox(i,j)>Pr ox(j,i), otherwise the link is predicted from j to i.

According to an embodiment of the present invention, direction-aware proximity measurements calculated as described above can be used to generate center-piece subgraphs. Given Q query nodes, a subgraph H can be generated that shows the relationship between the query nodes. The resulting subgraph H should contain the nodes that have a strong connection to all or most of the query nodes. Moreover, since this subgraph H can be used for visually demonstrating node relations, its visual complexity is capped by setting an upper limit, or a budget on its size. Using the direction-aware proximity measurements, such center-piece subgraphs (or connection subgraphs) can be adapted to include direction information from directed graphs.

According to another embodiment of the present invention, direction-aware proximity measurements calculated as described above can be used to generate attribute graphs. For graphs whose nodes are associated with discrete attributes, it is possible to explore relationships among the attributes to determine, for example, which attributes are similar and whether any nodes have symmetric attributes. For example, in a who-mails-whom network, where nodes representing people are labeled by there job title (attribute), it is possible to show how "managers" are related to "sales-persons", and conversely. Accordingly, the group direction-aware proximity measurements can be used to generate an attribute graph (AG). Let W be a directed graph, where the nodes each have an attribute with one of n' categorical values $(a_1, \ldots a_{n'})$. Let $A_i$ be the group of nodes whose attribute value is $a_i$. The associated attribute graph AG is an n'×n' weighted digraph where every node corresponds to an attribute and the edge weights show the group-to-group direction-aware proximity measurements, such that $AG(a_i, a_j) = Pr ox(A_i, A_j)$.

Figure 8:
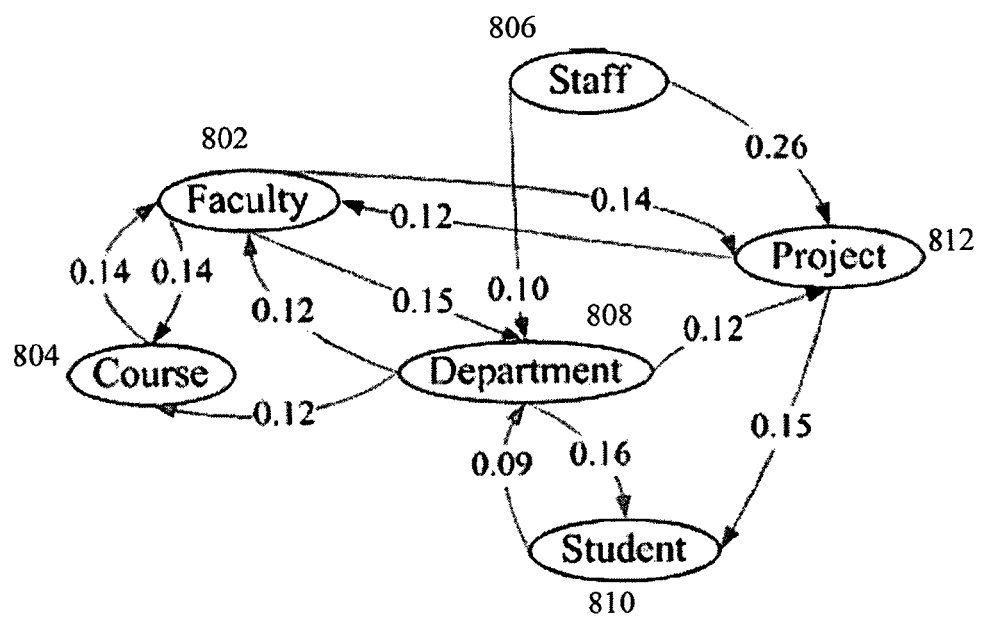
FIG. 8 illustrates an exemplary attribute graph.

FIG. 8 illustrates an exemplary attribute graph corresponding to a directed graph representing web link data. In the directed graph, nodes represent web pages and edges represent links. Each of the nodes are associated with one of the attributes: 'Department', 'Staff', 'Student', 'Faculty', 'Course', 'Project', and 'Other'. As illustrated in FIG. 8, these attributes are the nodes 802, 804, 806, 808, 810, and 812 of the attributed graph. The weights of the edges of the attribute graph of FIG. 8 are the direction-aware proximity measurements between the attributes. Accordingly, the attribute graph reveals the strength and symmetry of relationships between the attributes. For example, the strongest relationship between any of the attributes is between 'Staff' 806 and 'Project' 812, however, the relationship between 'Staff' 806 and 'Project' 812 is asymmetric. The relationship between 'Faculty' 802 and 'Course' 804 is a symmetric relationship, since the edges connecting 'Faculty' 802 and 'Course' 804 in both directions has a weight (proximity measurement) of 0.14.

As described above, methods for calculating direction-aware proximity measurements can be applied to various graph mining applications for directed graphs representing various types of networks. Some examples of type of networks include: a web link network, in which nodes represent web pages and edges represent links between web pages; a personal contact network (or who-contacts-whom network), in which nodes correspond to users and edges are weighted by daily contact time; a citation network, in which nodes represent papers and edges represent citations; an Epinions or Who-trusts-whom network, in which nodes represent users and an edge from a first node to a second node represents that a first user trusts a second user; and an anonymous email network, in which nodes represent email accounts and an edge from one node to another indicates that an account has sent one or more email messages to another account. It is to be understood, that the above examples are exemplary, and are not intended to limit the present invention.

Figure 9:
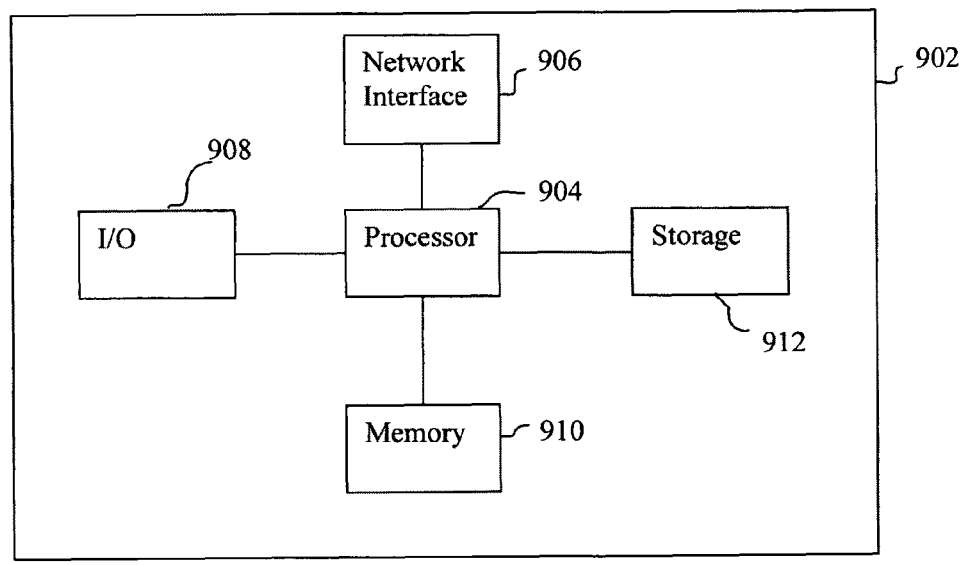
FIG. 9 illustrates a high level block diagram of a computer capable of implementing the present invention.

The above described methods may be implemented on one or more computers using well known computer processors, memory units, storage devices, computer software, and other components. A high level block diagram of such a computer is shown in FIG. 9. Computer 902 contains a processor 904 which controls the overall operation of the computer 902 by executing computer program instructions which define such operation. The computer program instructions may be stored in a storage device 912 (e.g., magnetic disk) and loaded into memory 910 when execution of the computer program instructions is desired. Thus, the method steps of FIG. 2, as well as various methods described herein for calculating direction-aware proximity measurements, and various graph mining applications can be defined by the computer program instructions stored in the memory 910 and/or storage 912 and the buddy list function will be controlled by the processor 904 executing the computer program instructions. The computer 902 also includes one or more network interfaces 906 for communicating with other devices via a network. The computer 902 also includes input/output 908 which represents devices which allow for user interaction with the computer 902 (e.g., display, keyboard, mouse, speakers, buttons, etc.) One skilled in the art will recognize that an implementation of an actual computer will contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for graph mining a directed graph including a plurality of nodes and a plurality of directed edges, comprising:
   calculating, at a processor, a direction-aware proximity measurement from at least one first node to at least one second node, the direction-aware proximity measurement based on an escape probability from said at least one first node to said at least one second node; and
   performing, at a processor, at least one graph mining application using the direction-aware proximity measurement from said at least one first node to said at least one second node.

2. The method of claim 1, wherein the direction-aware proximity measurement is equal to said escape probability adjusted by a constant representing a universal sink in the directed graph.

3. The method of claim 1, wherein said step of calculating a direction-aware proximity measurement comprises:
   calculating the direction-aware proximity measurement from said at least one first node to said at least one second node based on a candidate graph selected from the directed graph, said candidate graph including a portion of the directed graph, wherein edges leading from nodes in the portion of the directed graph to nodes out of the portion of the directed graph are preserved in the candidate graph.

4. The method of claim 1, wherein said step of calculating a direction-aware proximity measurement comprises:
   generating backward edges in opposite directions of original edges in the directed graph; and
   calculating the direction-aware proximity measurement from said at least one first node to said at least one second node based on the original edges and the backward edges.

5. The method of claim 1, wherein the escape probability $ep_{i,j}$ between node i and node j is defined as:

$$ep_{i,j} = \sum_{k=1}^{n} c \cdot p_{i,k} \cdot v_k(i,j),$$

where c is a constant representing a universal sink, $v_k(i,j)$ is a probability that a random particle starting from node k will reach node i before node j, and $p_{i,k}$ is a probability of a direct transition from node i to node j.

6. The method of claim 1, wherein said at least one first node comprises a first group of nodes and said at least one second node comprises a second group of nodes.

7. The method of claim 1, wherein said step of calculating a direction-aware proximity measurement comprises:
   estimating the direction aware-proximity measurement between said at least one first node and said at least one second node without calculating a matrix inversion, by using an efficient iterative solver.

8. The method of claim 1, wherein said step of calculating a direction-aware proximity measurement comprises:
   calculating an inversion matrix by inverting a Laplacian-like matrix of the directed graph; and
   calculating a plurality of direction-aware proximity measurements based said inversion matrix.

9. The method of claim 1, wherein said step of performing at least one graph mining application using the direction-aware proximity measurement comprises at least one of:
   predicting existence of links between nodes in a directed graph, based on the direction-aware proximity measurements calculated from each of the nodes to the other one of the nodes; and
   predicting a direction of a link connecting a pair of nodes.

10. The method of claim 1, wherein said step of performing at least one graph mining application using the direction-aware proximity measurement comprises:
    generating a center-piece subgraph based on direction-aware proximity measurements calculated for a plurality of query nodes.

11. The method of claim 1, wherein said step of performing at least one graph mining application using the direction-aware proximity measurement comprises:
    generating an attribute graph based on direction-aware proximity measurements calculated between groups of nodes.

12. An apparatus for graph mining a directed graph including a plurality of nodes and a plurality of directed edges, comprising:
    means for calculating a direction-aware proximity measurement from at least one first node to at least one second node, the direction-aware proximity measurement based on an escape probability from said at least one first node to said at least one second node; and
    means for performing at least one graph mining application using the direction-aware proximity measurement from said at least one first node to said at least one second node.

13. The apparatus of claim 12, wherein the direction-aware proximity measurement is equal to said escape probability adjusted by a constant representing a universal sink in the directed graph.

14. The apparatus of claim 12, wherein said means for calculating a direction-aware proximity measurement comprises:

means for calculating the direction-aware proximity measurement from said at least one first node to said at least one second node based on a candidate graph selected from the directed graph, said candidate graph including a portion of the directed graph, wherein edges leading from nodes in the portion of the directed graph to nodes out of the portion of the directed graph are preserved in the candidate graph.

15. The apparatus of claim 12, wherein said means for calculating a direction-aware proximity measurement comprises:
means for generating backward edges in opposite directions of original edges in the directed graph; and
means for calculating the direction-aware proximity measurement from said at least one first node to said at least one second node based on the original edges and the backward edges.

16. The apparatus of claim 12, wherein said means for calculating a direction-aware proximity measurement comprises:
means for estimating the direction aware-proximity measurement between said at least one first node and said at least one second node without calculating a matrix inversion, by using an efficient iterative solver.

17. The apparatus of claim 12, wherein said means for calculating a direction-aware proximity measurement comprises:
means for calculating an inversion matrix by inverting a Laplacian-like matrix of the directed graph; and
means for calculating a plurality of direction-aware proximity measurements based said inversion matrix.

18. The apparatus of claim 12, wherein said means for performing at least one graph mining application using the direction-aware proximity measurement comprises:
means for predicting existence of links between nodes in a directed graph, based on the direction-aware proximity measurements calculated from each of the nodes to the other one of the nodes; and
means for predicting a direction of a link connecting a pair of nodes.

19. The apparatus of claim 12, wherein said means for performing at least one graph mining application using the direction-aware proximity measurement comprises:
means for generating a center-piece subgraph based on direction-aware proximity measurements calculated for a plurality of query nodes.

20. The apparatus of claim 12, wherein said means for performing at least one graph mining application using the direction-aware proximity measurement comprises:
means for generating an attribute graph based on direction-aware proximity measurements calculated between groups of nodes.

21. A computer readable medium storing computer executable instructions for graph mining a directed graph including a plurality of nodes and a plurality of directed edges, the computer executable instructions defining steps comprising:
calculating a direction-aware proximity measurement from at least one first node to at least one second node, the direction-aware proximity measurement based on an escape probability from said at least one first node to said at least one second node; and
performing at least one graph mining application using the direction-aware proximity measurement from said at least one first node to said at least one second node.

22. The computer readable medium of claim 21, wherein said at least one first node comprises a first group of nodes and said at least one second node comprises a second group of nodes.

23. The computer readable medium of claim 21, wherein the computer executable instructions defining the step of calculating a direction-aware proximity measurement comprise computer executable instructions defining the step of:
estimating the direction aware-proximity measurement between said at least one first node and said at least one second node without calculating a matrix inversion, by using an efficient iterative solver.

24. The computer readable medium of claim 21, wherein the computer executable instructions defining the step of calculating a direction-aware proximity measurement comprise computer executable instructions defining the steps of:
calculating an inversion matrix by inverting a Laplacian-like matrix of the directed graph; and
calculating a plurality of direction-aware proximity measurements based said inversion matrix.

25. The computer readable medium of claim 21, wherein the computer executable instruction defining the step of performing at least one graph mining application using the direction-aware proximity measurement comprise computer executable instructions defining at least one of the steps of:
predicting existence of links between nodes in a directed graph, based on the direction-aware proximity measurements calculated from each of the nodes to the other one of the nodes;
predicting a direction of a link connecting a pair of nodes;
generating a center-piece subgraph based on direction-aware proximity measurements calculated for a plurality of query nodes; and
generating an attribute graph based on direction-aware proximity measurements calculated between groups of nodes.

* * * * *